United States Patent [19]
Shahid

[11] Patent Number: 5,632,908
[45] Date of Patent: May 27, 1997

[54] METHOD FOR MAKING ALIGNED FEATURES

[75] Inventor: Muhammed A. Shahid, Ewing Township, Mercer County, N.J.

[73] Assignee: Lucent Technologies Inc., Murray Hill, N.J.

[21] Appl. No.: 382,106

[22] Filed: Feb. 1, 1995

[51] Int. Cl.[6] .................................................. G02B 6/00
[52] U.S. Cl. ................... 216/2; 216/24; 216/41; 216/47
[58] Field of Search .................. 216/39, 27, 41, 216/47, 56, 24, 2; 156/647.1, 644.1, 659.1, 661.1, 651.1, 662.1

[56] References Cited

U.S. PATENT DOCUMENTS

| | | | |
|---|---|---|---|
| 4,818,058 | 4/1989 | Bonanni | 350/96.2 |
| 5,131,978 | 7/1992 | O'Neill | 216/2 |
| 5,316,618 | 5/1994 | Van Lintel | 156/644.1 |

*Primary Examiner*—Thi Dang
*Attorney, Agent, or Firm*—Lester H. Birnbaum

[57] ABSTRACT

An optical fiber support member is made by forming on a monocrystalline silicon substrate member (26) a first mask layer (27) of, e.g., silicon dioxide. The first mask layer is masked and etched to a first depth to define a pattern of first (29) and second (30) features, the first features defining the locations of optical fiber support grooves (15), and the second features defining the locations of support member reference surfaces (17, 19). Next, only the second features are etched to a second depth deeper than the first depth. Finally, the first and second features are simultaneously etched into the substrate such that the second features are etched to a greater depth than the first features. By defining the first and second features simultaneously in a single mask and etch step, one can assure the final precise alignment of etched V-grooves to etched reference surfaces. The second masking and etching step is used only to increase the depth of the second features defining the reference surfaces, not to determine their alignments. Consequently, if this second masking step is slightly misaligned, it will not necessarily result in a misalignment of the V-grooves with respect to the reference surfaces.

21 Claims, 2 Drawing Sheets

METHOD FOR MAKING ALIGNED FEATURES

TECHNICAL FIELD

This invention relates to methods for making aligned features, and, more particularly, to methods for making such features in crystal bodies such as are used for supporting optical fibers.

BACKGROUND OF THE INVENTION

The U.S. patent of Bonanni, No. 4,818,058, granted Apr. 4, 1989, incorporated herein by reference, describes an optical fiber connector comprising a pair of support members on opposite sides of an array of parallel optical fibers. The support members are made of monocrystalline silicon into which matching V-grooves, for holding the fibers, have been formed by photolithographic masking and etching. The sides of the support members define reference surfaces against which bear a pair of alignment pins. The pins allow the connector to be precisely abutted to another identical connector to splice together two arrays of optical fibers, i.e., to abut each optical fiber with a fiber of the other array with sufficient precision to allow optical energy to flow relatively unimpeded through the interconnection. The Bonanni device is successful because of the great precision with which V-grooves can be defined in monocrystalline silicon.

The reference surfaces on the sides of each support member are defined by etching to a significantly deeper depth than the etching used to define the fiber-supporting V-grooves. Although the Bonanni patent says that it may be possible to make the reference surfaces simultaneously with the fiber V-grooves, the specifications for most optical fiber connectors make such simultaneous etching impractical; instead, the reference surfaces must be made by a masking and etching step which is separate from the etching step used to make the fiber V-grooves. This in turn requires a high degree of alignment of the reference surface features with the fiber V-groove features. This requirement has been found to reduce the yield of optical fiber connectors since, in some cases, the masks defining the reference surfaces are sufficiently misaligned with respect to the V-grooves as to make the support member unusable. That is, if the reference surfaces are misaligned too much with respect to the fiber V-grooves, the alignment pins will be misaligned with respect to the optical fibers, and the accuracy of abutment needed for successful splicing as described above will not be met.

Consequently, there is a long-felt need in the industry for a method for making optical fiber connectors in which the reference surfaces are in precise predetermined registration with respect to the fiber-supporting V-grooves. There is a further need that this be accomplished in a way that does not require extraordinary cost or exceptionally high skill on the part of the workers using the method.

SUMMARY OF THE INVENTION

An optical fiber support member is made by forming on a monocrystalline substrate member a first mask layer of, e.g., silicon dioxide. The first mask layer is masked and etched to a first depth to define a pattern of first and second features, the first features defining the locations of optical fiber support grooves, and the second features defining the locations of support member reference surfaces or reference grooves. Next, by a second masking and etching step, only the second features are etched to a second depth deeper than the first depth. Finally, the first and second features are simultaneously etched into the substrate such that the second features are etched to a greater depth than the first features.

By defining the first and second features simultaneously in a single mask and etch step, one can assure the final precise alignment of etched V-grooves to etched reference grooves. The second masking and etching step is used only to increase the depths of the second features defining the reference grooves, not to determine their alignments. Consequently, as will become clear later, if the second masking step is slightly misaligned, laterally or rotationally, it will not necessarily result in a misalignment of the V-grooves with respect to the reference surfaces. The improved method thus builds in a relatively large tolerance for error, permitting the method to be practiced by workers with less skill than would be indicated by the extremely close tolerances that can be obtained by the inventive method.

These and other objects, features and benefits of the invention will be better understood from a consideration of the following detailed description taken in conjunction with the accompanying drawing.

DETAILED DESCRIPTION

Figure 1:
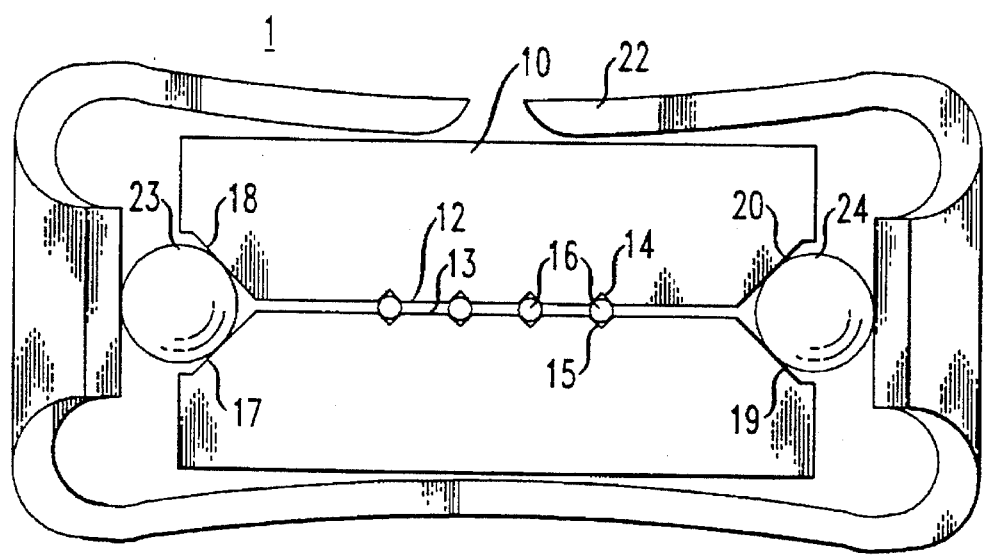
FIG. 1 is a schematic view of an optical fiber connector of the prior art.

The drawings are not necessarily to scale, with, in some cases, dimensions being distorted to aid in clarity of exposition. Referring to FIG. 1, there is shown an optical fiber connector 1 comprising a pair of support members 10 and 11 having surfaces 12 and 13 that face each other. The support members are made of a monocrystalline material such as silicon into which an array of V-grooves 14 and 15 have been etched. The V-grooves are of a size and shape such that, when the two support members 10 and 11 are bonded together, corresponding grooves 14 and 15 in each member will support an optical fiber 16 from an array of optical fibers to be interconnected. Reference surfaces 17, 18, 19 and 20 are defined on the sides of support members 10 and 11. A spring 22 forces a pair of alignment rods 23 and 24 against these reference surfaces. The alignment rods thereafter bear against similar reference surfaces of another connector to align the optical fibers 16 with the optical fibers carried by the other connector. Alternatively, the alignment rods 23 and 24 may extend from another connector which is being aligned with connector 1. In any case, it can be seen that the proper functioning of the apparatus requires that reference surfaces 17–20 be appropriately located with respect to the V-grooves 14 and 15 used to support the optical fibers 16.

The Bonanni patent points out that support members 10 and 11 are advantageously made of monocrystalline silicon, which permits V-grooves 14 and 15 and references surfaces 17–20 to be made with precision by anisotropic masking and etching. For example, if the upper surface 13 of support member 11 is located in the (100) crystallographic plane, then V-grooves 15 will be etched so as to have surfaces lying in the (111) crystallographic plane. Consequently the side surfaces forming the V-grooves always form an angle of approximately fifty-five degrees with respect to surface 13. The depths of the V-grooves are primarily determined by the size of the openings in the etch mask. Likewise, reference surfaces 17–20 are anisotropically etched to extend at angles of approximately fifty-five degrees from the horizontal surfaces.

The Bonanni patent states that if undercutting of the mask can be eliminated during the etch process, one can theoretically etch the reference surfaces 17 and 19 at the same time that V-grooves 15 (of support member 11) are being etched. Unfortunately, undercutting can never be completely eliminated so that, in most practical cases, the reference surfaces 17 and 19 must be etched separately from the V-grooves 15. This means that the separate masking steps must be extremely accurately aligned to assure that the V-grooves 15 are in proper registration with the reference surfaces 17 and 19.

Figure 2:
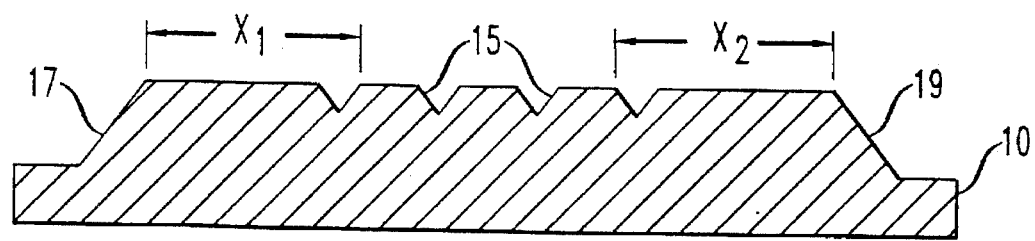
FIG. 2 is a schematic view of an optical fiber support member that may be used in the optical fiber connector of FIG. 1.

This consideration is demonstrated in FIG. 2. In this common design, for the reference surfaces to be registered properly with the V-grooves 15, the distance $X_1$ separating a corner of reference surface 17 from a corner of the nearest V-groove 15 must be exactly equal to $X_2$, the distance between reference surface 19 and a corresponding corner defining the nearest V-groove 15. If the mask defining the V-grooves 15 is slightly misaligned with respect to the mask defining reference surfaces 17 and 19, then $X_1$ may differ from $X_2$ by an amount that could make the support member 10 unusable. The specifications for different connectors of course differ, depending upon the use being made for them. Generally speaking, the alignment of single-mode optical fibers would require that $X_1$ equal $X_2$ to within a tolerance of less than 0.5 microns, whereas, with multimode fiber, the tolerances may be somewhat greater. In any event, one can see that the photomask defining the features that will eventually result in reference surfaces 17 and 19 must be extremely accurately placed with respect to the photomask defining the features that eventually result in V-grooves 15. The purpose of the present invention is to reduce the operator skill and expense necessary to achieve such high precision, and the manner in which this is done will be appreciated from a consideration of the method described with the reference to FIGS. 3–6.

Figure 3:
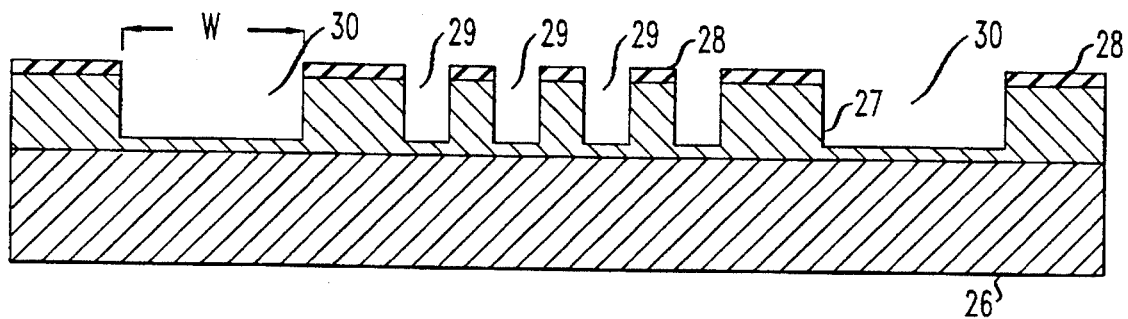
FIGS. 3–6 show schematically successive steps in making an optical fiber support member of the type shown in FIG. 2 in accordance with an illustrative embodiment of the invention.

Referring to FIG. 3, the silicon substrate 26 from which a silicon optical fiber support member is to be made is first coated with a mask layer 27, e.g., of silicon dioxide. Mask layer 27 is in turn coated with a photoresist layer 28. The photoresist layer is then masked with a photomask, exposed to actinic light, and developed to define etch mask openings. The mask layer 27 is then etched to make trenches 29 that will eventually define the locations of the fiber V-grooves, and trenches 30 that will eventually define the locations of reference surfaces 17 and 19 of FIG. 2. The trenches 29 and 30 are purposely made to be of a depth which is smaller than the total thickness of layer 27. The purpose for making this initial etch, part way through silicon dioxide mask layer 27, is to establish the alignment of features 30 with features 29. That is, since a single exposure with a single photomask is used to define both openings 30 and 29, the openings 30 and 29 can be made to be in precise alignment; slight movement of the photomask to the left or right would not misalign openings 30 with respect to openings 29.

After this operation, the photoresist layer 28 is removed, and a new photoresist layer 32 (FIG. 4) is deposited on the upper surface of the mask layer 27. The photoresist layer 32 is then exposed to define trenches 30' which are centered on the trenches 30 of FIG. 3, and is used as a mask to etch part way into layer 27. This etching extends the trenches 30 to the substrate 26 and exposes two portions of the substrate 26, each having a width corresponding to the width W of FIG. 3. Note that during this step, the features defining the locations of the fiber-supporting V-grooves remain masked. The openings 30' each have a width W+a, which is somewhat wider than the width W of trench 30. The reason for this is to assure that the opening 30' will cover the area defined by opening 30 of FIG. 3 even if the mask defining the area of 30' is slightly misaligned.

Figure 4:
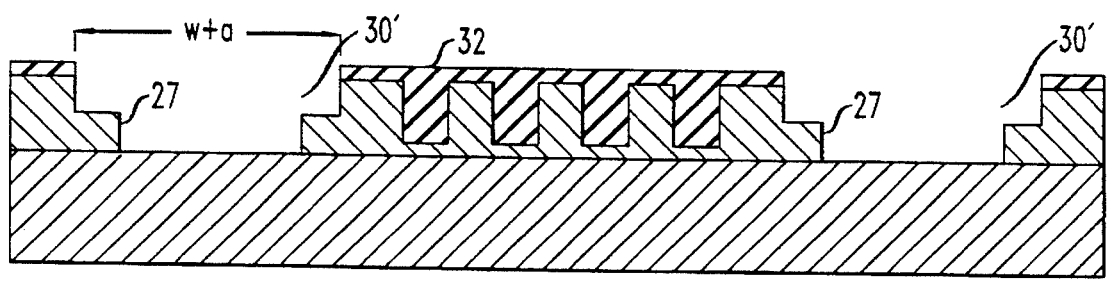
Figure 5:
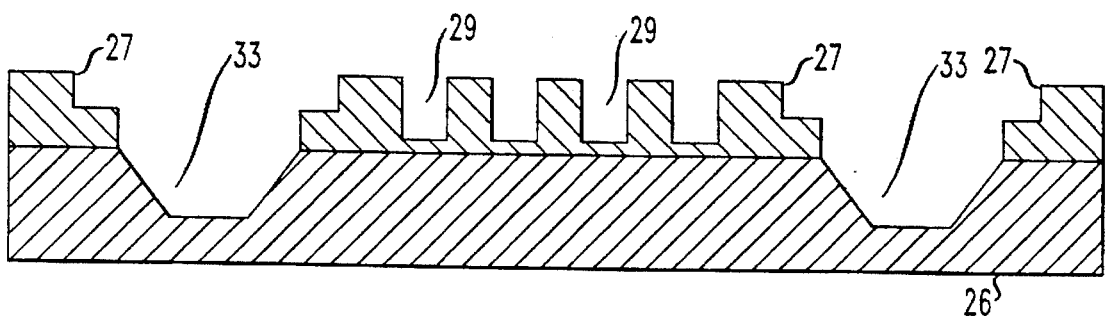
Figure 6:
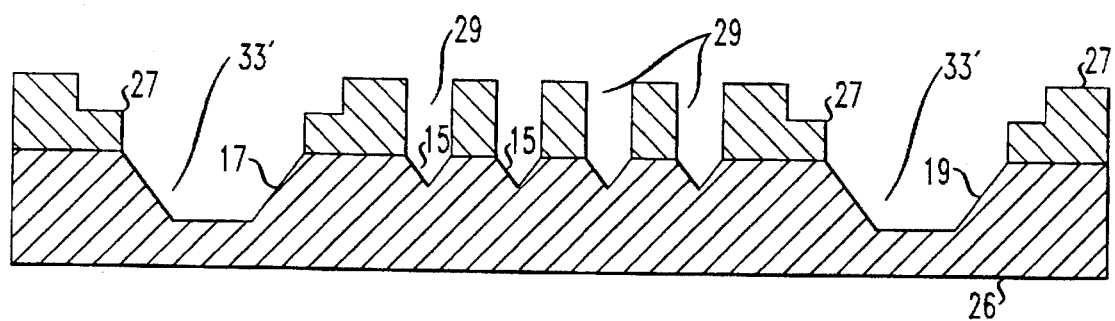

Referring to FIG. 5, the photoresist 32 of FIG. 4 is removed, and layer 27 is used as an etch mask to etch grooves 33 in the silicon substrate 26. Since the opening 30' of FIG. 4 is etched only part way into layer 27, the width of each groove 33 corresponds to the width W of each trench 30, rather than the width W+a of the opening 30' of FIG. 4. Groove 33, however, is preferably made to be somewhat shallower than the final depth of the reference groove needed for defining the reference surfaces 17 and 19 of FIG. 2.

The oxide layer 27 is then blanket etched to a depth sufficient to allow the trenches 29 in the masking layer 27 to reach to the silicon substrate 26. Since the vertical etch rate of silicon dioxide in buffered HF is much, much greater than the lateral etch rate, it is feasible to reduce the thickness of layer 27 as described without significantly affecting the locations of the lateral side walls, as is known in the art.

Without any further masking, the silicon dioxide mask layer 27 is then used as a mask to permit the etching of V-grooves 15 into the silicon substrate 26 while simultaneously etching reference grooves x' to a somewhat deeper depth than the grooves 33 of FIG. 5. The side surfaces 17 and 19 of grooves x' then correspond to the side surfaces 17 and 19 of FIG. 2. They are precisely aligned with the V-grooves such that $X_1$ of FIG. 2 precisely equals $X_2$. This is possible because, in FIG. 3, the width W of opening 30 is defined by the same mask that defines the openings 29 which eventually yield the V-grooves 15 of FIGS. 2 and 6. Thus, the photomask defining opening 30' of FIG. 4 can be misaligned to the left or right by as much as $a/_2$ without affecting the width of groove 33. This builds into the process a tolerance for misalignment, both lateral and rotational, without affecting the final product, thereby reducing the expense and operator skill needed to meet exacting alignment requirements.

The initial trenches 29 and 30 of FIG. 3 should preferably extend about two-thirds the distance into mask layer 27. The portion 30' of FIG. 4 may be made to extend one-third of the distance into layer 27, which would be sufficient to extend the original trenches 30 to the substrate 26. Next, the blanket etch of FIG. 6 will extend trenches 29 to the substrate, and will also move the step portion 30' nearer the substrate. However, it will preserve the width W of the trenches 30, thereby to insure that reference grooves 33' have a width W required for proper alignment of the reference grooves with the fiber grooves.

The mask opening width W of FIG. 3 (in the photoresist mask layer 28) for defining the reference groove opening is typically one thousand one hundred twenty-five microns. The widths of the openings 29 are each one hundred thirty-six microns which, with etch undercutting, provides V-grooves having an upper surface opening of one hundred forty microns and a depth of ninety-nine microns, which is appropriate for supporting a conventional optical fiber having a diameter of one hundred twenty-five microns. The reference groove 33' is typically etched to a depth of five hundred microns, which is appropriate for supporting an alignment rod having a diameter of seven hundred microns. Notice that the reference grooves 33' are each five times as deep as the V-grooves 15, which is a greater difference than that shown in FIG. 6 or FIG. 2. As can be seen from FIG. 1, the depth of the reference groove should be somewhat greater than the radius of the alignment rod, although the actual depth is not critical.

The silicon dioxide mask layer 27 was etched in a conventional manner using buffered hydrofluoric acid (HF). The etchant used for the silicon support member 26 was ethylene diamine pyrocatechol (EDP). If the mask layer 27 is of silicon nitride, the etchant may be potassium hydroxide (KOH), as is known in the art.

Other monocrystalline substances such as germanium could of course be used in place of the silicon substrate 26, and other substances could be used for the masking layer 27. It is not necessary that $X_1$ equals $X_2$ if the connector design calls for some other value. It is only important that the relative dimensions be made accurately to within the tolerances allowed by the design. While only one dimension W of the opening 30 is shown in FIG. 3, the principles of the invention could also be applied to the dimension "into the paper," perpendicular to W. The invention is particularly applicable to the fabrication of dies for making plastic optical fiber support members as described in the application of Roll et al., Ser. No. 08/186,935, filed Jan. 27, 1994, incorporated by reference herein. Accordingly, terms such as "support members" and "V-grooves" apply to dies for making such elements as well as the elements themselves.

The invention could be used for making structures other than optical fiber support members. Wherever it is needed to have a deep opening in a crystal substrate accurately aligned with a shallow opening, the invention may be of importance. For example, it is possible that the invention could be useful in conjunction with lasers or photodetectors which have been formed in a semiconductor crystal. Such devices may, for example, be aligned with an optical fiber or other optical waveguide defined by a groove in the crystal. Various other embodiments and modifications may be made by those skilled in the art without departing from the spirit and scope of the invention.

I claim:

1. A method for making an optical fiber support member comprising the steps of:

forming on a substrate member a first mask layer;
   simultaneously masking and etching to a first depth in the first mask layer a pattern of first and second features, the first features defining locations of optical fiber support grooves, and the second features defining the locations of support member reference surfaces;
   masking and etching only the second features to a second depth deeper than the first depth;
   and simultaneously etching into said substrate the first and second features such that the second features are etched to a greater depth than the first features.

2. The method of claim 1 wherein:

the step of masking and etching to a first depth comprises the step of overlying the first mask layer with a second photoresist mask layer, exposing and developing the second photoresist mask layer to incorporate therein the first and second features, and using the second photoresist mask layer as a mask to etch simultaneously the first and second features into the first mask layer to the first depth;

the first depth being smaller than the thickness of the first mask layer.

3. The method of claim 2 wherein:

the step of masking and etching to the second depth comprises overlying the first mask layer with a third photoresist mask layer, exposing and developing the third photoresist mask layer to incorporate therein only the second features, and using the third photoresist mask layer as a mask to etch only the second features into the first layer.

4. The method of claim 3 wherein:

the step of etching the second features to the second depth comprises the step of etching completely through the first mask layer at those locations corresponding to the second features.

5. The method of claim 4 further comprising the step of:

after etching the second features to the second depth, the first mask layer is used as a mask to etch only the second features into the substrate.

6. The method of claim 5 wherein:

after etching the second features into the substrate, the entire first mask layer is blanket etched sufficiently that the first features extend completely through the first mask layer, but insufficiently to etch away completely the portions of the first mask layer in which first or second features are not defined.

7. The method of claim 6 wherein:

after the blanket etch of the first mask layer, the substrate is etched using the first mask layer as a mask such that the second features are etched to a greater depth than the first features.

8. The method of claim 3 wherein:

openings in the third photoresist mask layer defining second features are wider than openings in the second photoresist mask layer defining second features.

9. The method of claim 8 wherein:

the substrate member is made of monocrystalline material.

10. The method of claim 9 wherein:

the step of masking and etching to a first depth comprises the step of overlying the second photoresist masking with a photomask containing both the first and second features.

11. A method for etching in a substrate first and second grooves having a predetermined registration, the second groove being deeper than the first groove, comprising the steps of:

forming on the substrate a first mask layer;
    forming over the first mask layer a second mask layer;
    using a first photomask having openings defining the relative locations of both the first and second grooves to define first and second openings in the second mask layer, the first and second openings corresponding to the locations of the first and second grooves respectively;
    etching the portions of the first mask layer exposed by the first and second openings to a first depth that is smaller than the thickness of the first mask layer;
    removing the second mask layer;
    applying to the first mask layer a third mask layer;
    using a second photomask having an opening defining the location of only the second groove to define a third opening in the third mask layer, the third opening corresponding to the location of the second groove but having a wider width than that of the second opening;

etching the portion of the first mask layer exposed by the third opening such that part of the first mask layer is etched to a second depth that is equal to the thickness of the first mask layer, thereby to form a fourth opening in the first mask layer which exposes the substrate, the fourth opening having a width substantially equal to the width of the second opening in the second mask layer;

etching the portion of the substrate exposed by the fourth opening to form part of the second groove;

etching the first mask layer to produce therein a fifth opening having a width corresponding to that of the first opening in the second mask layer;

and etching the portions of the substrate exposed by the fourth and fifth openings to form second and first grooves, respectively, the second groove having a greater depth than the first groove.

12. The method of claim 11 wherein:

the substrate is made of a monocrystalline material;

and the etching of the substrate is anisotropic etching.

13. The method of claim 12 wherein:

the first groove is used to support an optical fiber, and one side of the second groove nearest the first groove is used as a reference surface.

14. The method of claim 13 wherein:

the substrate is an optical fiber support member;

a plurality of first grooves are made in the substrate for supporting a plurality of optical fibers;

and two second grooves are made in the substrate, the second grooves being on opposite sides of said first grooves;

one side of each second groove being used as a reference surface against which is abutted an alignment rod used for aligning optical fibers supported by the first grooves.

15. A method for making first and second grooves in a support member comprising the steps of:

forming on a substrate member a first mask layer;

simultaneously masking and etching to a first depth in the first mask layer first and second trenches, the first trench defining the location of a first groove, and the second trench defining the location of a second groove;

masking and etching the second trench to a second depth deeper than the first depth without etching the first trench;

and simultaneously etching into said substrate the first and second grooves such that the second groove is etched to a greater depth than the first groove.

16. The method of claim 15 wherein:

the step of masking and etching to a first depth comprises the step of overlying the first mask layer with a second photoresist mask layer, exposing and developing the second photoresist mask layer, and using the second photoresist mask layer as a mask to etch simultaneously the first and second trenches into the first mask layer to the first depth;

the first depth being smaller than the thickness of the first mask layer;

the step of masking and etching to the second depth comprises overlying the first mask layer with a third photoresist mask layer, exposing and developing the third photoresist mask layer, and using the third photoresist mask layer as a mask to etch only the second trench more deeply into the first layer than the first trench.

17. The method of claim 16 wherein:

the step of etching the second trench to the second depth comprises the step of etching completely through the first mask layer;

and after etching the second trench to the second depth, the first mask layer is used as a mask for etching part of the second groove into the substrate.

18. The method of claim 17 wherein:

after etching part of the second groove into the substrate, the entire first mask layer is blanket etched sufficiently that the first trench extends completely through the first mask layer, but insufficiently to etch away completely the portions of the first mask layer in which first or second trenches are not defined;

and after the blanket etch of the first mask layer, the substrate is etched using the first mask layer as a mask, such that the second groove is etched to a greater depth than the first groove.

19. The method of claim 18 wherein:

an opening in the third photoresist mask layer defining a second trench is larger than an opening in the second photoresist mask layer defining a second trench.

20. The method of claim 19 wherein:

the substrate member is made of monocrystalline material.

21. The method of claim 20 wherein:

the step of masking and etching to a first depth comprises the step of overlying the second photoresist masking with a photomask containing openings defining both the first and second trenches.

* * * * *